Dec. 29, 1970   F. L. D. CLOETE ET AL   3,551,118
SOLID/FLUID CONTACTING
Filed Oct. 12, 1967   7 Sheets-Sheet 1

Inventors
Francis Lewin Dirk Cloete
Michael Streat
By
Cushman, Darby & Cushman
Attorneys Dec. 29, 1970     F. L. D. CLOETE ET AL     3,551,118

SOLID/FLUID CONTACTING

Filed Oct. 12, 1967     7 Sheets-Sheet 2

Inventors
Francis Louis Dirk Cloete
Michael Streat
By
Cushman, Darby & Cushman
Attorneys Dec. 29, 1970    F. L. D. CLOETE ET AL    3,551,118
SOLID/FLUID CONTACTING
Filed Oct. 12, 1967    7 Sheets-Sheet 3

United States Patent Office 3,551,118
Patented Dec. 29, 1970

---

3,551,118
SOLID/FLUID CONTACTING
Francis Louis Dirk Cloete and Michael Streat, London, England, assignors to National Research Development Corporation, London, England, a British corporation
Continuation-in-part of application Ser. No. 317,180, Oct. 18, 1963. This application Oct. 12, 1967, Ser. No. 676,998
Claims priority, application Great Britain, Oct. 19, 1962, 39,707/62
Int. Cl. C01g 43/00
U.S. Cl. 23—321                                8 Claims

ABSTRACT OF THE DISCLOSURE

The invention relates to a process for countercurrent contacting of fluids and solids in a plurality of intercommunicating solid, fluid contacting chambers which involves allowing the phases to separate during the first part of each cycle and independently transferring a portion of the settled solids. The process is useful in recovering uranium oxide, $U_3O_8$, from an ore leach solution containing sulphuric acid.

---

This is a continuation-in-part of our application Ser. No. 317,180, filed Oct. 18, 1963, now abandoned.

This invention relates to a process of contacting a fluid phase with a particulate solid phase in countercurrent so as to promote mass exchange between the two phases, and an apparatus in which to carry out the process.

In certain fields of technology it has hitherto proved impossible to devise a process of solid/fluid contacting which is genuinely countercurrent in nature, i.e. in which the motion of the two phases through a contacting vessel is substantially continuous and opposite in direction. The tendency of the particulate solid to fluidize, particularly when the two phases do not differ greatly in density, upsets the independence of flow of the two phases thus precluding any investigation of function in terms of theoretical plate height, and it is frequently extremely difficult to extract each respective phase from an end of the system uncontaminated by the other.

Passing the fluid vertically downwards through a bed of the solid is not a satisfactory solution since the solid tends to pack into a compact mass giving a small plate height and creating further problems with regard to upward movement of the solid. In one such proposed system the solid is normally stationary but is periodically moved upwards by a predetermined amount, a quantity of spent solid being removed from the top of the column and a corresponding quantity of fresh solid being introduced at the bottom. Various further proposals have been put forward with the object of eliminating the undesirable disturbing effect on the main portion of the solid bed brought about by the periodic upward movement.

In accordance with the present invention, these difficulties are avoided in a process and apparatus in which countercurrent or similar continuous fluid/solids contacting take place, for example for ion exchange or other physical or chemical interaction, while solids are periodically dispersed at least in part in the fluid. There are alternate periods of disturbance and settling of the particles such that in between times when the solids are dispersed to promote interaction they settle out at least in part to give substantial fluid/solids separation. When the solids settle, there are created one or more substantially solid-free fluid phase volumes and one or more substantially fluid-free solid phase volumes. Transfer of fluid and/or solids through the system is effected by movement of fluid from one or more of these substantially fluid phase volumes and/or movement of solids from one or more of these substantially solid phase volumes.

More specifically the invention consists in contacting a fluid phase with a particulate solid phase in countercurrent. A fluid feed through a series of contactor stages containing the solid is subjected to a flow cycle, the configuration of the stages and the characteristics of the flow cycle being such that (a) during one part of each cycle the two phases are allowed to separate, (b) in another part of the cycle separated solids from each stage is transferred into, and dispersed in, separated fluid in the next preceding stage and (c) in a further part of the cycle separated fluid from each stage is transferred into, and disperses, separated solids in the next following stage.

The fluid may be liquid or gas, and the operations to which the process of the invention may be applied include bleaching, ion-exchange, crystallisation, drying, adsorption, roasting, solid-particle-catalysed gas-phase and liquid-phase reactions and a variety of gas- or liquid-solid chemical reactions.

In the preferred embodiment of the invention, the flow cycle applied to the fluid phase has a wave-form including reversal of flow, and the configuration of the contactor stages is such that the separation of the phases occurs at the zero portion of each cycle, and the solid transfer and fluid transfer from each contactor stage occurs at the negative and positive portion respectively of each cycle. Best results are obtained for certain unsymmetrical waveforms and with a cycle period of from about 1 minute to about 1 hour.

The configuration of the stages should permit effective dispersal of solids in fluid during both the negative and positive portions of each cycle, that is both when solids are introduced into the fluid-rich region of a contactor stage and when fluid is introduced into the solids-rich region, for it is by means of such dispersal that effective mass-exchange between the phases is brought about.

The stages should also be constructed so that at the zero-fluid-velocity portion of each flow cycle, prior to the negative portion of the cycle, as complete as possible a separation of the phases can occur by settling of the solids. Phase separation at this point is particularly important in order to achieve independence of flow of the two phases. Each stage must also, of course, be provided with means communicating with adjacent stages in the series by which separated fluid can pass in the forward direction during the positive portion of the cycle and separated solids in the reverse direction during the negative portion of the cycle. The fluid velocity during the positive part of the cycle should not be so great as to entrain solid in the forward direction between stages.

A particular advantage of the invention is that the degree of dispersion, the throughput and the degree of separation may be regulated in any given case merely by controlling the wave-form, frequency and amplitude of the flow cycle applied to the fluid feed.

In one embodiment, the contactor stages are constituted by trays in a vertical column. Alternatively, a series of appropriately connected horizontal vessels may be employed; the invention may even be put into practice by the use of a convoluted tube, the configuration of the convolutions of which is determined by the function which the tube is to serve.

The application of reversing cyclic flow in the form of symmetrical pulses to a liquid stream moving in counter-current to a solids stream is known from a number of earlier proposals. One such proposed system employs a column having trays which extend across almost the whole width of the column, having a gap for downward feed of solids; the trays are provided with a weir over which solids must pass to reach the next stage. During the low-fluid-velocity portions of each pulse period the solid in each stage settles and cannot pass the weir; during high-fluid-velocity portions of each pulse period the solid is fluidized and passes over the weir in that condition. This system does not therefore include the essential feature of the present invention, which is that each phase passes into an adjacent stage as nearly as possible in a monophasic condition, that is while separated from the other phase.

In another system which has been proposed previously, the liquid stream flowing through a horizontal series of contactor stages is, in each stage, subjected to a vertical pulsation, i.e. a pulsation transverse to its direction of flow. There is in this case no necessary relation between the degree or kind of pulsation applied to different stages and the pulsation is only responsible for solid phase transfer insofar as the basically gravitational transfer of solid through the system is facilitated by the agitation.

The invention also includes apparatus for carrying out the fluid/solids contacting process.

In order that the invention be more clearly understood some embodiments thereof will now be described, by way of example, with reference to the accompanying drawings in which.

Figure 1:
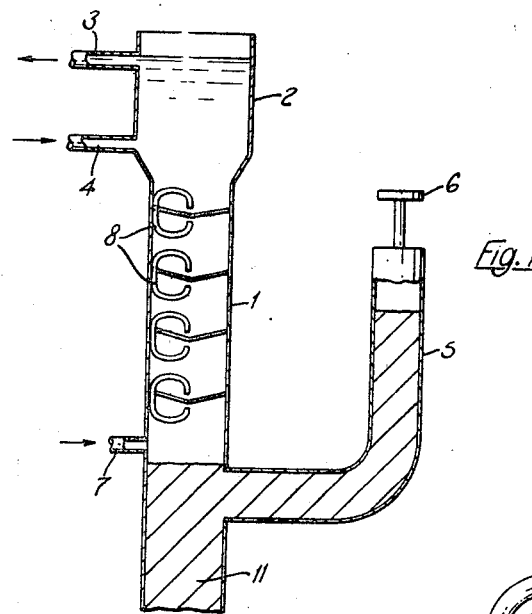
FIG. 1 is a diagrammatic elevation of a vertical column contactor.

FIG. 1 of the drawing shows a column 1 having an enlarged upper portion 2 from which fluid may be withdrawn by a conduit 3 and into which solids may be introduced by a conduit 4. The lower part of the column 1 is in communication with the balancing leg 5 of a flow cycle generator indicated schematically at 6, and the fluid feed, upon which the variations produced by the generator 6 are imposed, is through a conduit 7 positioned a little above the junction of the column 1 and the balancing leg 5.

The part of the column 1 between this junction and the enlarged upper portion 2 contains a number (only four shown) of contactor elements 8 whose construction is shown in detail in FIG. 2 and is hereinafter more fully described. The portion 11 of the column 1 which lies below the junction of the column with the pulse leg 5 forms the pathway for removal of solids from the system.

In operation a constant fluid feed is applied between conduits 7 and 3 and a constant solids input is drawn through the conduit 4, the solids flowing down the column under the combined influence of gravity and the negative portions of the flow cycles induced by the generator 6. The solids are eventually discharged from the system at 11.

Figure 2:
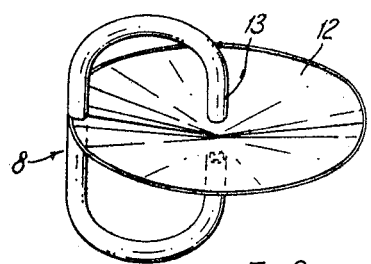
FIG. 2 is a detailed perspective view of a column element which may be employed in the column of FIG. 1.

An element 8 is shown in detailed perspective in FIG. 2, and consists of a conical dish 12 which occupies the whole cross-section of a column and is by-passed by a circular conduit 13 one end of which takes off from the lower part of the inside of the dish (which is mounted in the column with its apex lowermost). As can be seen from FIG. 1, the take off of the upper end of conduit 13 is below the rim of dish 12 so that it is below the level of solids which settle in the dish at the zero part of the cycle. The lower position of the by-pass terminates in a short vertical portion below the apex of the dish. During operation solids fall into the bottom of each dish at low-fluid-velocity portions of each cycle and cover the mouth of conduit 13; at negative portions of the cycle solids are sucked from the bottom of the dish 12 through a conduit 13 and drop into the fluid supernatant in the next dish; conversely, at positive portions of the cycle fluid is forced upwards through the conduit 13 into the solids in the bottom of the dish 12. These movements cause the solids to disperse from the dish 12 into the fluid above it. Thus at both positive and negative portions of the cycle there is phase dispersion.

Figure 3:
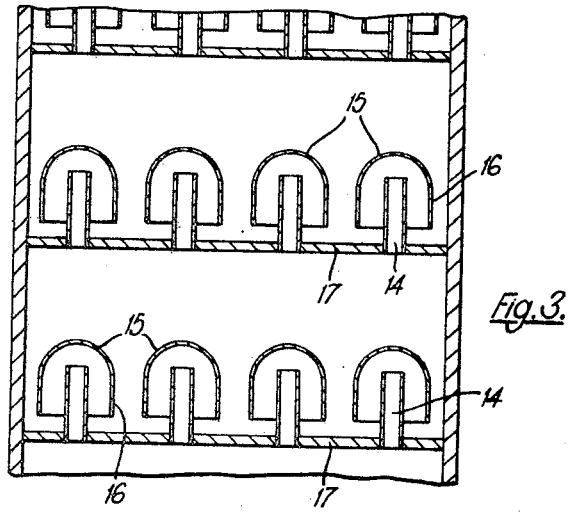
FIG. 3 is a detail of a section through a column, similar to that of FIG. 1, which employs a further type of column element.

A section of large-diameter column containing an alternative type of column element is shown in FIG. 3. Each element is mounted on an impermeable tray 17 extending across the column and consists of a high chimney 14 which passes through the tray and is surmounted by a domed cap 15 having an extended impermeable skirt 16.

In operation the depth of solids on each tray is greater than the distance of the bottom of the skirt 16 above the tray surface: fluid passing up through the chimneys 14 when the cycle is positive is thus forced through the solids settled on the tray 17; when the cycle is negative, settled solids are sucked up the gap between the skirt 16 and the chimney 14 and dropped into the liquid overlying the solids on the next tray down the column.

Figures 4, 5, 6:
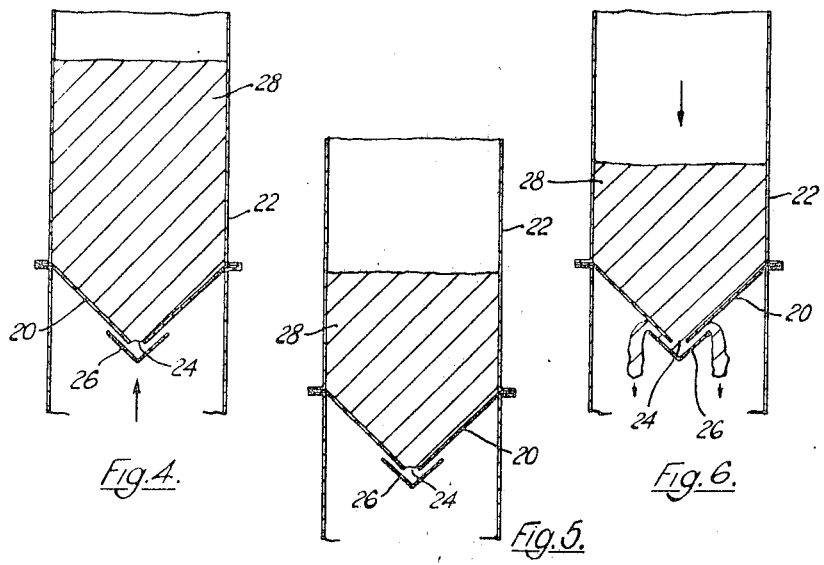
FIGS. 4–6 are diagrammatic elevations of another type of vertical column element illustrating the behavior of the solid held on the element at different portions of an applied pulse cycle.

A section of a large-diameter column containing a further type of column element is shown in FIGS. 4, 5 and 6 each of which illustrates the behavior of the solids at a different portion of the cycle. Each element comprises an inverted conical plate 20 which is attached to the wall 22 of the column and which has an aperture 24 at its apex to allow passage of the phases from one stage to the next. Beneath the aperture 24 there is located a small V-shaped baffle 26 which serves to prevent solids transferring downwards except during the negative portion of the cycle and also, as will hereinafter become apparent, to distribute the descending solids across the cross-section of the column.

FIG. 4 shows the behavior of solids 26 held on the plate 20 during positive portions of the applied cycle, when the fluid passes upwards from the next preceding stage through the aperture 24 and the solids 26 held on the plate 20 which is thus dispersed an tends towards the fluidized state. Mass transfer between the two phases occurs during this portion of the cycle.

As the flow approaches that portion of its cycle where the fluid flow rate is at a minimum, the gravitational forces acting on the solid particles overcome the small force of ascending fluid in the opposite direction and the particles begin to settle as indicated in FIG. 6, which, compared with FIG. 5, shows a reduced solids volume. During this portion of the cycle the phases separate until by the time the fluid flow is reversed substantially complete separation of the fluid from the solids held on the plate has occurred.

When the fluid flow is reversed, the solid particles are sucked from the plate 20 through the aperture 24, as indicated in FIG. 6, and are distributed by the baffle 26 evenly on to the next lower plate and are dispersed in the fluid supernatant thereon. The cycle is completed as forward flow of fluid is resumed and reproduces the condition shown in FIG. 4.

Figure 7:
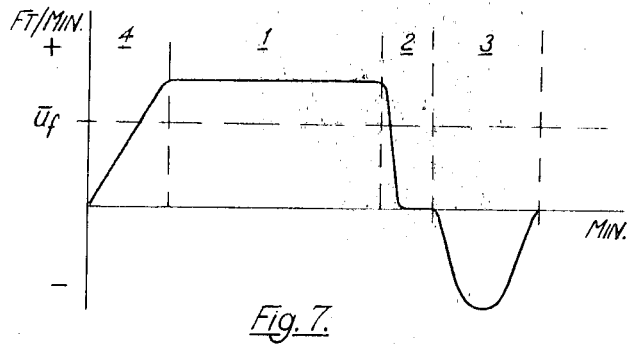
FIGS. 7 and 8 show the effect on the fluid flow rate and solid flow rate respectively of a single flow cycle.

It will be apparent from the above that the degree of separation of the phases and the degree of their dispersion at the different parts of the fluid cycle, and hence the degree of contamination of the end products and the quantity of mass transfer achieved in any given case, depends to a very large extent on the wave-form of the applied flow cycle, its frequncy and its amplitude. A wave-form suitable for liquid/solids transfer in a vertical column is shown in FIG. 7 which is a graph of fluid velocity (in ft./min.) plotted against time (min.).

The wave-form shown therein is asymmetrical and as indicated on the graph consists of four distinct portions. During portion 1 the fluid velocity is positive (i.e. the fluid is ascending the column and dispersing the solid phase, as described above with reference to FIG. 4) and is constant. It will be seen that the duration of portion 1 is approximately half the time of the complete cycle. A high degree of phase mixing and hence mass transfer thus occurs during this stage. The maximum flow rate is limited by the terminal falling velocity of the solid particles in the fluid which must not be exceeded if entrainment is to be avoided.

In portion 2, the fluid velocity rapidly decreases to zero and is maintained thereat for the relatively short time necessary to achieve substantially complete phase separation, as described above with reference to FIG. 6. The minimum time for this part of the cycle is very short and may range from less than 1 second for gas-solid systems to up to 10 seconds for ion-exchange resins in water.

Figure 8:
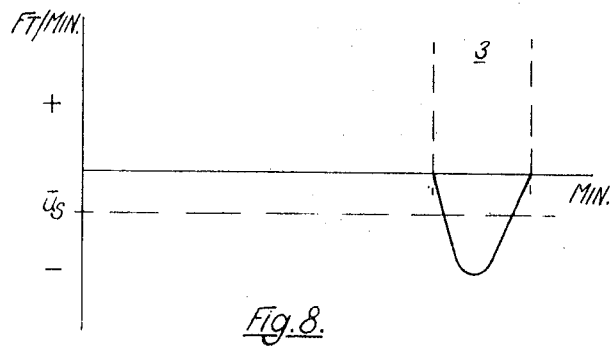

In portion 3, the fluid velocity rapidly reaches a maximum from which it equally rapidly returns to zero. During this portion of the pulse cycle, solids are transferred from one contactor stage to the next, as illustrated in FIG. 8 which is a graph of velocity of solids flow plotted against time for a flow cycle of the wave-form shown in FIG. 7. It will be appreciated that the amount of solids transferred during this portion can be controlled positively, and in all cases should be less than about 50% in order to avoid any tendency of solid particles to by-pass a complete stage. In most cases, from about 1 to 30% of solids is transferred and is usually accompanied by about the same volume of fluid.

In the last portion, portion 4, the fluid which has been entrained during the solids transfer is returned by normal fluid upflow which fairly quickly reaches the maximum and constant value which it has in portion 1.

The average velocity of the fluid over the complete cycle is indicated in FIG. 7 by the dotted line marked $\overline{u_f}$ and is positive, which is to say that over each cycle there is a net flow of fluid up the column. Similarly the average velocity of the solid flow is indicated at $\overline{u_s}$ in FIG. 8 and is negative, which is to say that over each cycle there is a net flow of solids down the column. From the point of view of its performance, therefore, it will be seen that the method of the invention can be made to approximate to a continuous countercurrent process.

Figure 9:
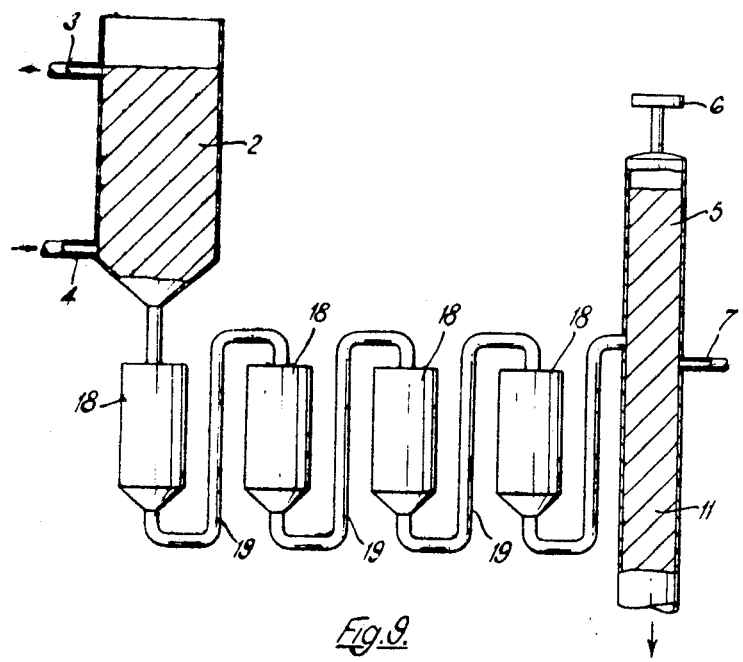
FIG. 9 shows diagrammatically a contactor comprising a number of interconnected horizontal stages.
Figures 10, 11, 12:
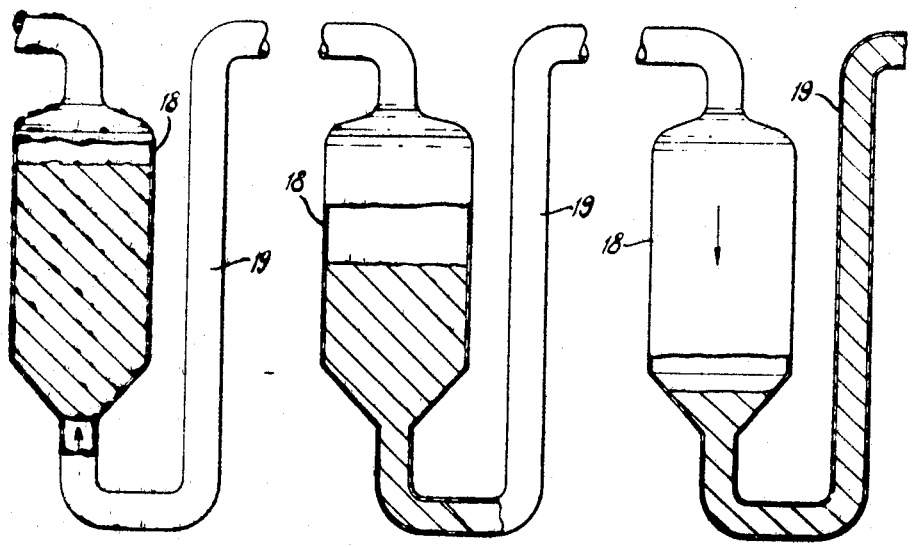
FIGS. 10–12 illustrate the behavior of the solid held on one of the stages shown in FIG. 9 at different portions of the flow cycle.

The arrangement shown in FIG. 9 differs from those previously described in that the motion of the counterflowing phases is through a horizontal series of contacting stages; since the parts indicated by the reference numerals 2, 3, 4, 5, 6, 7 and 11 do not differ materially in construction or function from the parts similarly designated in FIG. 1 these will not be further described. The arrangement consists basically of a series of vessels 18 interconnected by conduits 19, of diameter less than half that of the vessels 18, which join the bottom part of each vessel 18 with the top part of the vessel 18 preceding it in the series; the behavior of the solid phase in each of the stages shown in FIG. 9 at portions of the flow cycle corresponding to positive fluid velocity, zero fluid velocity and negative fluid velocity is illustrated in FIGS. 10–12 respectively. It will be seen form these drawings that the behavior of the solid phase is strictly analogous to the behavior of the solid phase in the elements shown in FIGS. 4–6 and described above.

Figure 13:
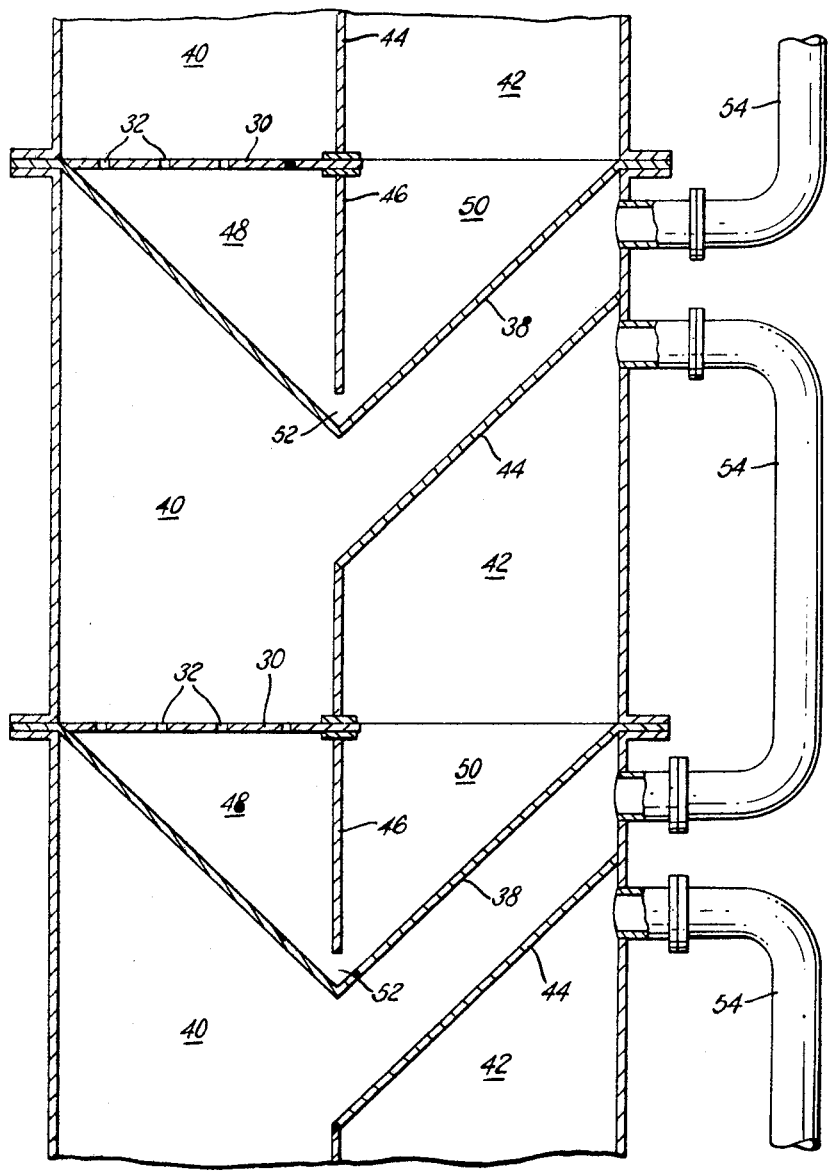
FIG. 13 is a diagrammatic elevation of a further type of vertical column contactor.

During operation, it is desirable to maintain a constant hold-up of solid phase on each contactor stage in order to achieve a reasonable degree of efficiency of mass transfer in each stage and thus to keep the number of stages required for a given degree of transfer within reasonable limits. A column having means for ensuring a constant hold-up is shown in FIG. 13. Therein each contactor stage is shown as comprising a plate 30 which extends part way across the column and which has a large number of perforations 32 of a diameter considerably larger than the size of the solid particles to be dealt with by the column.

Each stage is separated from its adjacent stages by an impermeable conical baffle 38 located beneath the perforated plate 30, and the column space between each plate 30 and the baffle 38 of the adjacent following stage is divided into two compartments 40 and 42 by an impermeable partition 44 which extends from the column wall on one side to the inner edge of the plate 30. A partition 46 divides the space between the plate 30 and the baffle 38 into two compartments 48 and 50 which communicate with each other through a small space 52 between the lower edge of the partition 46 and the apex of the baffle 38. Each stage communicates with its adjacent stages for passage of the phases through a conduit 54 external to the column which connects the space 42 of one stage to the space 40 of the next preceding stage.

In operation of the column a bed of solids will be held on the plate 30. At substantially zero fluid flow a proportion of the solids bed will settle through the perforations 32 and into the space 48. During reverse flow of fluid, solid will be drawn from the space 48 into the space 50 and from there into the adjoining space 42, and in due course will be transferred by the conduit 54 to the space 40 and the plate 30 of the next preceding stage.

Upon forward flow of fluid, such solids as have been carried, during the preceding negative flow period, into the spaces 48, 50 and 42 and part of the conduit 54 will be carried back through the plate 30 to become again part of the solids bed thereon. It will be apparent, therefore, that solids associated with each plate will perform a to-and-fro motion through the plate perforations and within the spaces 48, 50 and 42, with some solids spilling down through the conduit 54 to the stage below during each negative flow period; but no such spillage will take place until a particular solids hold-up has been achieved in that stage, which hold-up is thereafter maintained substantially constant.

Figure 14:
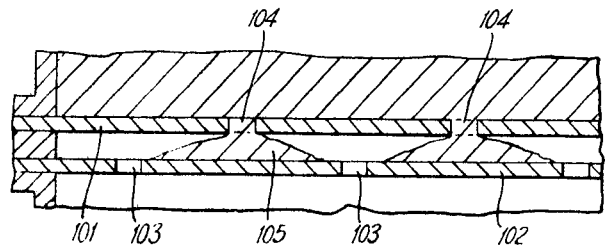
FIG. 14 is a detail of an alternative arrangement to that shown in FIG. 13.
Figure 15:
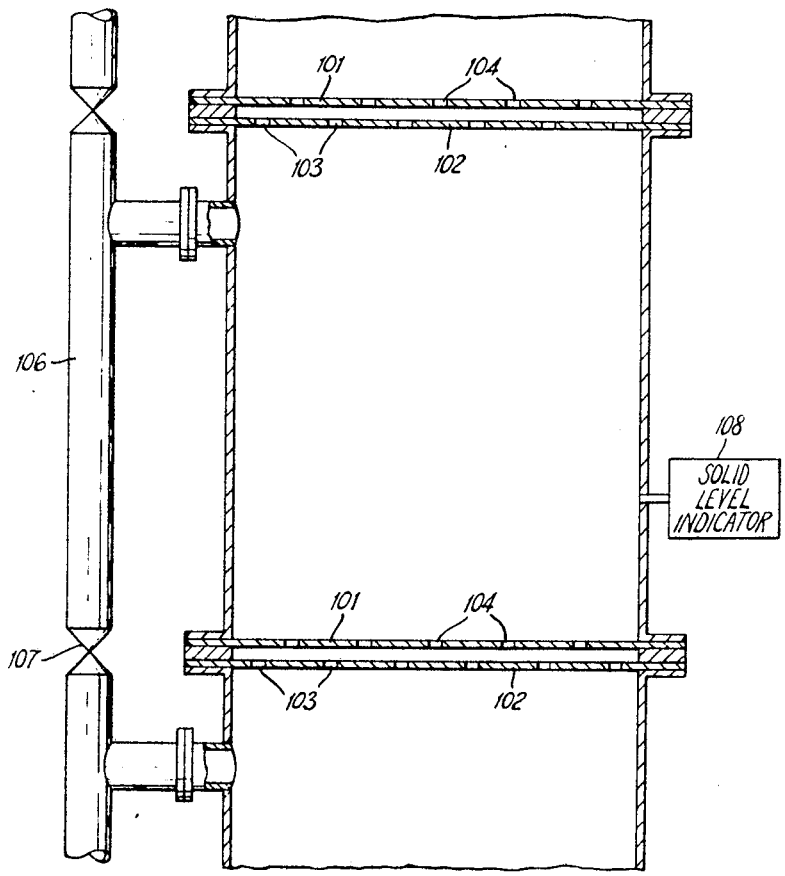
FIG. 15 is a more general view of the arrangement of FIG. 14.

Referring now to FIGS. 14 and 15, another way of providing for hold-up of the solid phase in each stage is to support the bed on a pair of spaced plates 101, 102 one close below the other and each perforated, with the perforations 103, 104 in the two plates mutually offset. There will then be a tendency for each perforation in the upper plate to be blocked by a pile of solids 105 resting on the lower plate as shown in FIG. 14. During each negative flow period, however, there will be carry through of solids by the fluid into the stage below. In order to control the amount of solids left behind on the plates when this carry through by the fluid occurs, it is advantageous to provide a bypass conduit 106 (FIG. 15) around each plate pair which incorporates a valve 107 operated, either manually or automatically, in accordance with the observed or instrument-sensed hold-up on the plates, as by means of a solids level indicator 108, whereby a regulated amount of the fluid flowing from stage to stage during the negative flow period can be bypassed without going through the plates.

Figure 16:
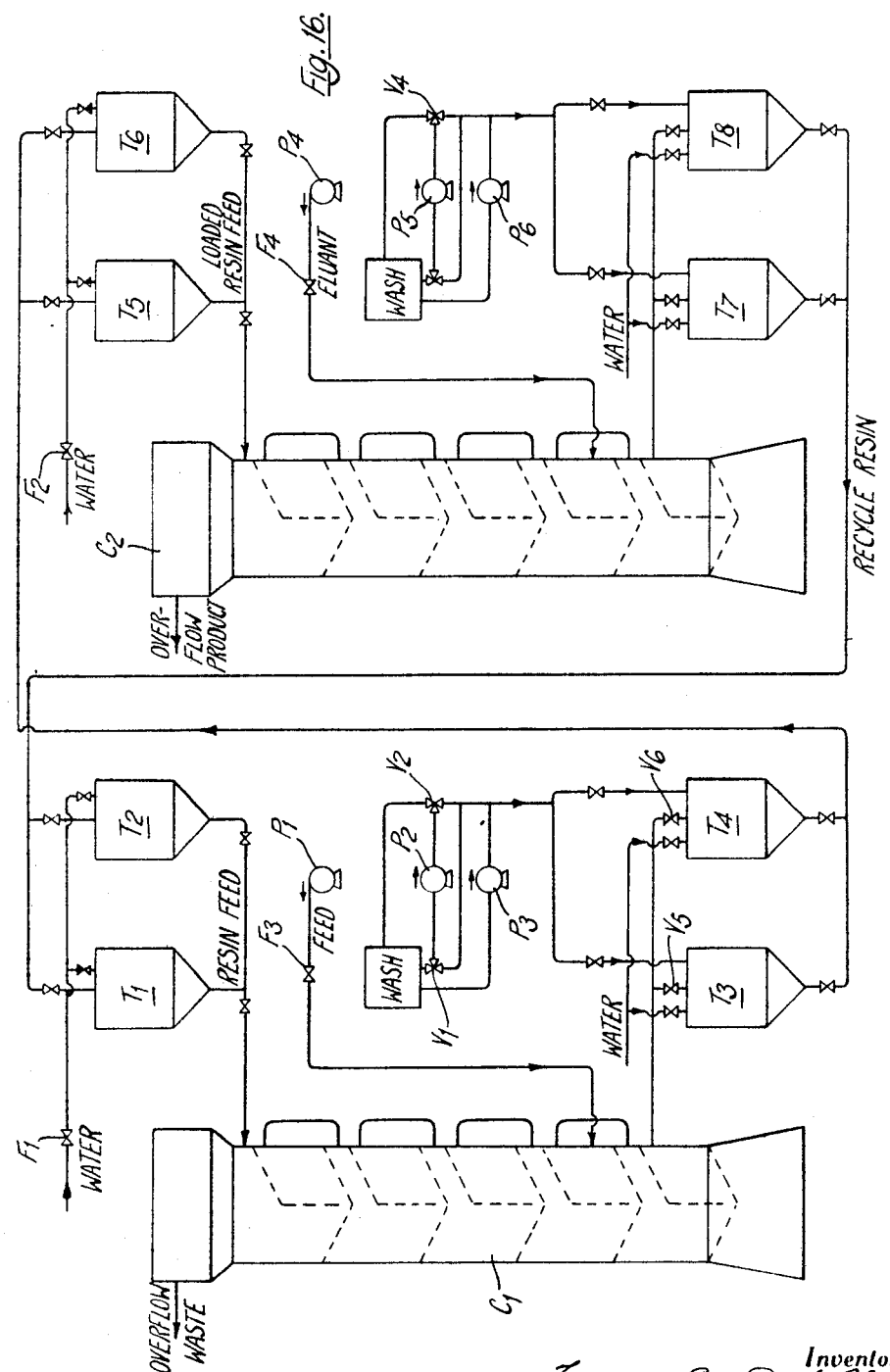
FIG. 16 is a flow diagram of an ion-exchange process employing the invention.

The invention will now be further illustrated by the following description of a process of recovering uranium oxide $U_3O_8$ from a typical ore leach solution containing free sulphuric acid to a pH of 1.8 and 1.0 gram of $U_3O_8$ per liter. A flow-sheet of the apparatus used is shown in FIG. 16. The process is designed to recover 400 kilograms of $U_3O_8$ in each 24 hours of operation. The solids phase is a strongly basic anion exchange resin in the size range —10 to +20 mesh, which after the adsorption is completed is eluted by the method of the invention with a 1.0 molar aqueous solution of sodium chloride to give a solution containing 10.0 grams of $U_3O_8$ per liter from which pure $U_3O_8$ is subsequently recovered by precipitation with ammonia.

The mass transfer is effected in two columns $C_1$, $C_2$ (see FIG. 16) which are of the type described above with reference to FIG. 13 i.e. equipped with means for maintaining a constant hold up of solids in each contactor stage. The details of the columns $C_1$, $C_2$ and other items of equipment are given at the end of this description.

In order to give the entire operating conditions of the process, a short description of it will now follow.

Feed solution is pumped at a rate of 16.75 m.³/hr. from storage by a centrifugal pump $P_1$ via a flow controller $F_3$ to stage 2 of the column $C_1$. The flow cycle is applied to the liquid in the column by pumps $P_2$ and $P_3$ through the tanks $T_3$ or $T_4$ and its duration is 7 minutes made up as follows: liquid feed at an instantaneous flow rate of 23.5 m.³/hr. for 5 minutes; one minute when no flow of liquid takes place and the solids settle on the stages; and one minute when the two way valves $V_1$, $V_2$ around pump $P_2$ reverse the liquid flow through the column at an instantaneous liquid flow of 5 m.³/hr. transferring settled solid at an instantaneous flow rate of 2.46 m.³/hr. Thus during the minute of fluid flow down the column, 0.041 cubic meter of solids are transferred from one stage to the next preceding stage, and from stage 1 to the resin collecting tank $T_3$ or $T_4$. For each complete cycle, therefore, the average liquid flow rate is 16.75 m.³/hr. and the average solids flow rate is 0.35 m.³/hr.

Included within the 5 minutes of feed flow is one minute during which the pump $P_2$ returns to the column the 0.084 cubic meter of liquid which it withdrew from the column during the negative portion of the cycle. After this minute, the pump $P_2$ is recirculating water in the wash water feed tank for the next five minutes. Pump $P_3$ feeds wash water continuously to the column at a rate of 0.05 m.³/hr. which is sufficiently small not to interfere with the operations described above.

Similarly for the elution column $C_2$, eluent liquor containing 1 molar sodium chloride is pumped from storage by pump $P_4$ through flow controller $F_4$ to stage 2 of column $C_2$. The cycle period for this column is 3 minutes made up of 1 minute of settling with no flow, 1 minute of reverse flow at a liquid flow of 2.10 cubic meters per hour and 1 minute of eluent feed at 3.45 cubic meters per hour. During the minute of eluent feed pump $P_5$ returns the 0.035 cubic meter to the column which it withdrew during reverse flow. Hence the column stages are designed for a maximum instantaneous liquid flow rate of 5.55 cubic meters per hour. The average eluent feed rate is thus 1.15 m.³/hr. and the average resin flow rate is 0.35 m.³/hr. The resin leaving the column is washed by a continuous flow rate of water of 0.05 cubic meter per hour from pump $P_6$ as in column $C_1$.

The resin product from column $C_1$ collects in one of the collecting tanks $T_3$ or $T_4$. Only one of these is connected to stage 1 at any one time, the other being isolated from the column by valve $V_5$ or $V_6$. When one collecting tank is full, every three hours approximately, it is isolated from the column and the other tank then connected to the column. The full collecting tank is then pressurized with mains water and the resin forced out through the pipe at the base to the appropriate feed tank to the eluting column $C_2$, i.e. either tank $T_5$ or $T_6$. In a similar manner eluted resin is transferred from tanks $T_7$ and $T_8$ to feed tanks $T_1$ and $T_2$. Resin is fed to the columns from the feed tanks $T_1$, $T_2$, $T_5$ and $T_6$ by forcing settled resin out from the base of the appropriate tank with mains water at a rate controlled by flow controllers $F_1$ and $F_2$ to column $C_1$ and $C_2$ respectively.

The details of the columns $C_1$, $C_2$ are as follows:

| Column | Diameter, m. | Stage spacing, m. |
| --- | --- | --- |
| $C_1$ | 1.8 | 0.50 |
| $C_2$ | 0.90 | 0.50 |

The details of the pumps are as follows:

| Type | | Pump duty (m.³/hr.) |
| --- | --- | --- |
| Pump: | | |
| $P_1$ | Centrifugal | 23.5 |
| $P_2$ | Rotary-positive displacement | 5 |
| $P_3$ | Rotary-positive displacement | 0.05 |
| $P_4$ | Centrifugal | 3.45 |
| $P_5$ | Rotary-positive displacement | 2.10 |
| $P_6$ | Rotary-positive displacement | 0.05 |

An important advantage over conventional techniques of the above described process for recovering uranium oxide is that the necessity for filtering the ore leach solution to remove the small quantities of solids usually entrained therewith is avoided as the action of the contactor column is not seriously affected by the presence of small quantities of solid in the liquid phase.

Amongst many other applications of the invention may be mentioned the purification of water by removal of cations such as calcium, sodium, and magnesium on a cation ion-exchange resin using two contactors, one of which absorbs the ions on to the resin, producing water free of metallic cations, while the other contactor regenerates the used resin from the first contactor with a strong acid solution. The objectionable anions, such as sulphate and chloride, in the water can subsequently be removed by a similar process using an anion-exchange resin which is regenerated with strong alkali solution.

A similar combination of two contactors can also be used to exchange hydrogen ions for sodium ions, producing a fatty acid from a fatty acid salt in one unit and regenerating the resin to the hydrogen form with strong acid in the second unit. Other useful ion-exchange processes which may be effected include the recovery of chromium and similar valuable metals from plating waste solutions; recovery of gold from leach solutins; the ion exchange or charcoal decolorization and purification of sugar solutions; and dye solution deionization. Yet further applications are in the leaching of coarse ground oxidized copper ore with sulfuric acid, and roasting of pyrites minerals to produce sulfur dioxide.

In general, the maximum instantaneous value of the fluid flow rate during any part of the cycle is limited by the need to prevent the carry-over of some solid particles by the fluid flowing from one stage to the next. Some guide to this fluid velocity may be easily obtained in small-scale experiments or from data published by manufacturers of the solids handled. For example, for ion-exchange resin in the standard industrial size range of —14 to +52 mesh the maximum superficial linear water velocity is of the order of 15 centimeters per minute. From his, the stage diameter required to handle any given quantity of fluid can be calculated. The pressure drop over the equipment can be estimated from standard data and hence the pump duty specified.

Unless the waveform of the flow cycle is very unusual, the limiting factor in design of equipment is the flow rate of fluid, and once this has been used to size the stages, the solids flow rate used is determined by the proportions and waveform of the flow cycle. Pressure drop during reverse flow of solids can again be estimated for design purposes from published data.

It must be borne in mind that the overall or average flow rates of fluid or solid depend both on the maximum instantaneous flow rate and the proportion of the cycle period during which it is obtained. Thus for any given operating plant the ratio of the average flow rates of solid to fluid may be altered by simple adjustment of the cycle program controller. A contactor may operate anywhere within the range from zero average fluid flow with maximum average solid flow to zero average solid flow with maximum average fluid flow. This is an extremely important advantage of the invention.

The determination of the number of stages to be used for a given separation can be carried out by using the conventional McCabe-Thiele method for a continuous countercurrent stagewise process. Mass transfer runs were carried out in a small scale contactor in which a synthetic cation ion-exchange resin was passed countercurrent to an aqueous solution through the contactor. On the caesium/hydrogen chloride system measurements showed that the stage efficiency was between 40% and 85% of the theoretical value for an ideal stage based on a McCabe-Thiele diagram.

As has been indicated above, the solids may sometimes be fed to the contactors in the form of a slurry in the case of liquid/solid systems. The feed may be drawn from a slurry feed tank, which is provided with an agitator to keep the slurry homogeneous and maintain a constant solids input rate, by a variable speed positive displacement rotary pump. Alternatively, a variable speed positive displacement rotary pump may impel a liquid into the top part of a slurry settling tank thus forcing a settled-slurry feed from the bottom of the tank.

Similarly, solids product can be removed from the system by being fed into a settling tank from the bottom of which the settled slurry is periodically forced by hydraulic pressure. The tank may simply be an extension of a contacting column, fluid being injected and the settled slurry withdrawn, by variable speed positive displacement rotary pumps the relative speeds of which can be adjusted so that no fluid flows into or out of the actual contacting columns. With this type of pump the solid slurry output can be made independent of variation brought about by the variations of flow in the column.

Figure 17:
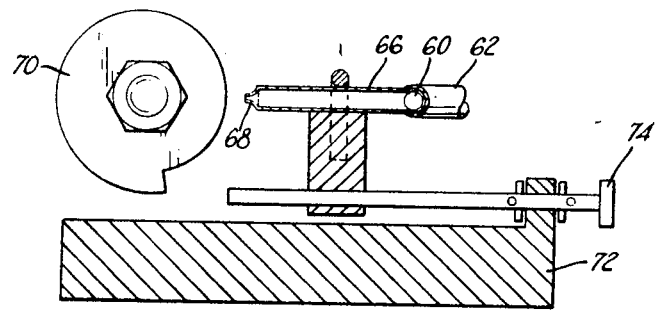
FIGS. 17 and 18 illustrate a suitable means for generating the flow cycle.
Figure 18:
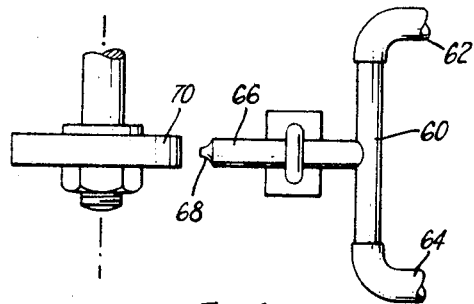

An example of a suitable cycle generator which may be used for controlling the fluid cycle will now be described with reference to FIGS. 17 and 18 of the drawings which show a cycle generator in section and in plan respectively.

A pipe 60 is connected at one end 62 to a source of compressed air (not shown) and at its other end 64 to the balancing leg. The pipe 60 has a limb 66 which terminates in a nozzle 68 from which a stream of the compressed air escapes. Facing the nozzle 68 is the surface of a cam 70, rotatably mounted in bearings (not shown), which is so close to the nozzle 68 as to impede the escape of air from that nozzle. Both the pipe 60 and the cam 70 are mounted on a base-plate 72 with respect to which, however, the pipe 60 is movable by adjustment means 74 by which the mean distance of the nozzle 68 from the cam 70 can be varied.

In operation, the air pressure at 62 is dissipated at nozzle 68 and feed input 64. The amount of air permitted to escape through nozzle 68 depends on the closeness to the nozzle of the surface of cam 70; rotation of the cam alters this amount, and this alteration is reproduced as a cyclic variation in the feed output 64.

The frequency and waveform of this variation are determined respectively by the speed and shape of the cam 70; its amplitude may be increased by operating the adjusting means 74 to bring the cam 70 closer to the nozzle 68.

The cycle generator just described is primarily intended for use in controlling the flow of a liquid supply, but it can also be employed in controlling the flow of a gaseous supply, especially where the subsequent path of the gas stream is short and undue distortion of the imposed waveform by reason of the elasticity of the gas will not occur. It may of course, be necessary to take precautions to ensure that a poisonous or otherwise dangerous gas is not allowed to escape from the nozzle of the cycle generator into an environment where its presence is undesirable.

Figure 19:
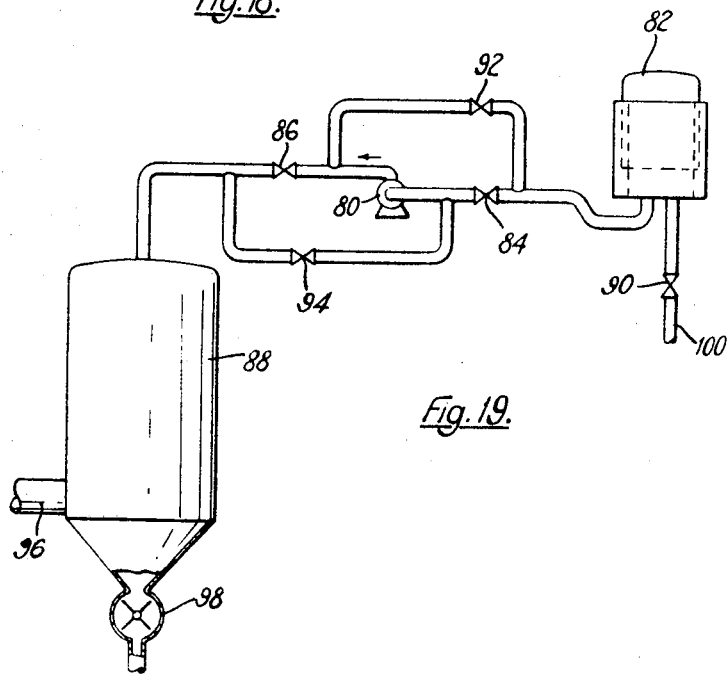
FIG. 19 illustrates a second means for reversing the fluid feed.

Referring now to FIG. 19, this illustrates an embodiment of a gas/solid contacting system in accordance with the invention which system incorporates an alternative arrangement for controlling the gaseous supply.

The actual series of contacting stages is not shown in the figure since the contacting stages can be similar in construction to any of those already described.

In the figures, a rotary or centrifugal blower 80 draws a stream of gas from a gas holder 82 via valve 84 and expels it, via valve 86, into the separator 88 of the series of contactor stages; the gas holder 82 is meanwhile supplied from a source 88 via valve 90. Provision is made for automatic reversal of the direction of gas flow in the flow-path between the gas holder 82 and the separator 88; this reversal is accomplished by opening valves 92 and 94 simultaneously with closure of valves 84, 86 and 90. The blower 80 then draws gas from the separator 88 and delivers it into the holder 82 until this latter fills to a predetermined level, whereupon the five valves are triggered back to their original settings to restore the initial direction of flow. The periodic reversals of gas flow into the separator appear as regular flow reversals in the gas feed in a connection 96 between the separator 88 and the actual contacting system. Solid is withdrawn from the system by a rotating star valve 98 in the base of the separator.

It will be apparent that the invention has wide application in the chemical processing industries. In addition to the advantages already mentioned, the invention enables many processes to be carried out at much reduced operating and capital costs. In some cases it may be possible to adapt plant operating according to existing techniques to work by the method of the invention, and this will naturally lead to a saving in capital costs. In yet other cases, the invention may make feasible processes which hitherto have been but theoretical curiosities.

What is claimed is:

1. A process for countercurrent contacting of fluids and solids wherein ion exchange or other physical or chemical interaction occurs while the solids are dispersed at least in part in the fluid comprising:

flowing a fluid phase countercurrent to a solid phase through a series of contactor stages containing the solid, in a plurality of cycles, allowing said two phases to separate during a first part of each cycle, then transferring a portion of the separated solid from each contactor stage substantially independently of the separated fluid in that stage to the separated fluid in the next preceding stage, while said liquid and solid are separated, during a second part of each cycle, and transferring a portion of the separated fluid substantially free of entrained solids from each contactor stage into the separated solid in the next following stage, and thereby redispersing the solid in each stage in the fluid, prior to allowing the fluid and solid in each stage to separate in the first part of the next cycle.

2. A process for countercurrent contacting of fluids and solids in a plurality of intercommunicating solid-fluid contacting chambers which comprises:

introducing solid material into a first fluid-solid contacting chamber, introducing fluid into a subsequent fluid-solid contacting chamber, for countercurrent flow towards said first chamber, flowing said fluid from said subsequent chamber to said first chamber, intermittently interrupting flow of said fluid through said chambers to allow solids in each chamber to settle under the influence of gravity, intermittently reversing the flow of said fluid and transferring settled solids, substantially free of entrained fluid, from each fluid-solid contacting chamber to the next subsequent contacting chamber, and resuming said countercurrent flow of said fluid, the fluid entering each chamber through a lower portion thereof to resuspend said solid material for efficient fluid-solid contact.

3. A process as set forth in claim 2 in which said fluid flow has an assymmetrical waveform.

4. A process as set forth in claim 2 in which the velocity of fluid, during transfer of fluid in said countercurrent flow, rises to a preferred value and is maintained at said preferred value for a time.

5. A process as set forth in claim 2 in which the duration of a flow cycle of forward, interrupted and reverse flow is greater than 30 seconds.

6. A process as set forth in claim 2 in which, for each cycle, the quantity of solid transferred from each chamber to a next preceding chamber is less than 50% of the solid held up in each stage.

7. A process as set forth in claim 2 in which the level of solids held up in each chamber is maintained substantially constant during the same part of each cycle.

8. A process as set forth in claim 2 in which the solids transferred to said next adjacent chamber are introduced into an upper portion of said next adjacent chamber to move downwardly through the separated liquid therein.

References Cited

UNITED STATES PATENTS

| | | | |
|---|---|---|---|
| 3,238,125 | 3/1966 | Mihara et al. | 210—189 |
| 3,208,934 | 9/1965 | Kingsbury | 210—33 |
| 3,056,743 | 10/1962 | Eichhorn et al. | 210—189 |
| 2,932,552 | 4/1960 | Weiss et al. | 23—338 |
| 2,801,966 | 8/1957 | Mertes et al. | 210—33 |
| 2,742,381 | 4/1956 | Weiss et al. | |

LELAND A. SEBASTIAN, Primary Examiner

U.S. Cl. X.R.

23—1, 177, 299, 310, 337, 338; 75—1, 101; 127—46; 210—19, 33, 38; 260—398